United States Patent
Steinbeck et al.

(10) Patent No.: US 7,481,397 B2
(45) Date of Patent: Jan. 27, 2009

(54) FORCE SUPPORTING DEVICE WITH A LOAD-DEPENDENT FORCE SUPPORT

(75) Inventors: Herbert Steinbeck, Hamburg (DE); Oleg Graf, Illertissen, DE (US)

(73) Assignee: Airbus Deutschland GmbH, Hamburg (DE)

( * ) Notice: Subject to any disclaimer, the term of this patent is extended or adjusted under 35 U.S.C. 154(b) by 27 days.

(21) Appl. No.: 11/576,728

(22) PCT Filed: Oct. 12, 2005

(86) PCT No.: PCT/EP2005/010968

§ 371 (c)(1),
(2), (4) Date: Apr. 5, 2007

(87) PCT Pub. No.: WO2006/040140

PCT Pub. Date: Apr. 20, 2006

(65) Prior Publication Data

US 2008/0035794 A1    Feb. 14, 2008

(30) Foreign Application Priority Data

Oct. 12, 2004    (DE)    .................. 10 2004 049 700

(51) Int. Cl.
B64D 11/00    (2006.01)

(52) U.S. Cl. .............. 244/118.5; 312/319.1; 312/319.2; 296/37.8

(58) Field of Classification Search .............. 244/118.1, 244/118.5; 312/319.1, 319.2, 325, 247; 296/37.8; 105/325, 329.1, 344; 248/584, 585, 591, 248/276.1

See application file for complete search history.

(56) References Cited

U.S. PATENT DOCUMENTS 5,244,269 A * 9/1993 Harriehausen et al. ...... 312/247

(Continued)

FOREIGN PATENT DOCUMENTS

DE    41 30 644 C2    3/1993

(Continued)

OTHER PUBLICATIONS

Forms PCT/ISA/210, 220, 237 International Search Report for PCT/EP2005/010968, mailed Feb. 9, 2006.

Primary Examiner—Michael R Mansen
Assistant Examiner—Michael Kreiner
(74) Attorney, Agent, or Firm—Wood, Herron & Evans, L.L.P.

(57) ABSTRACT

The invention relates to a force supporting device (10) for providing a load-dependent supporting force, in particular for a lowerable overhead locker (12) in an aircraft. The device (10) comprises a bracket (20), whose one end is attached to a supporting structure so as to be pivotal about an axis (P) and whose other end is configured for connection to an object to which the supporting force should be applied. There is also a gas-filled spring (22), whose one end is pivotally articulated to the bracket (20) and whose other is pivotally articulated to one end of an oscillating lever (24), whose other end is pivotally attached to a bearing plate (18) and which can pivot relative to the bearing plate (18) between a first end position and a second end position. By means of an arresting device the oscillating lever (24) can be arrested at a plurality of positions in the region of its first end position to the second end position. A displacing device (46) serves to pivot the oscillating lever (24) between its first end position and its second end position as a function of a load determining device which interacts with the displacing device (46).

18 Claims, 8 Drawing Sheets

Figure 1:
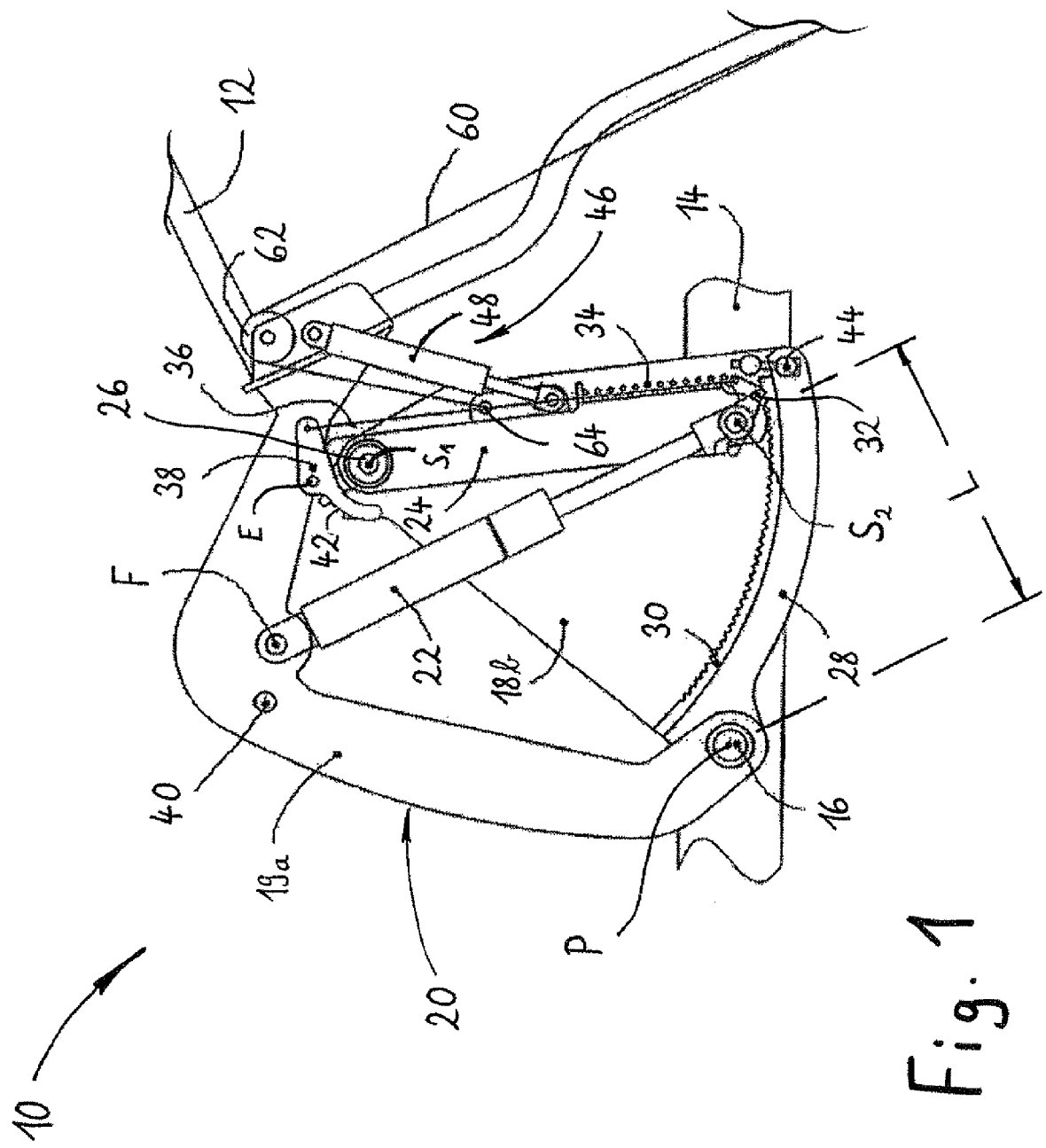

U.S. PATENT DOCUMENTS 6,045,204 A * 4/2000 Frazier et al. ............... 312/247
6,691,951 B2 * 2/2004 Frazier .................... 244/118.1
7,090,314 B2 * 8/2006 Burrows et al. ............. 312/246

FOREIGN PATENT DOCUMENTS

| DE | 43 35 151 A1 | 4/1995 |
| DE | 44 46 772 C1 | 5/1996 |
| DE | 19617657 A1 | 11/1997 |

* cited by examiner

FORCE SUPPORTING DEVICE WITH A LOAD-DEPENDENT FORCE SUPPORT

BACKGROUND OF THE INVENTION

The invention relates to a force supporting device for providing a load-dependent supporting force. The invention relates in particular to a force supporting device of this type for use in connection with a lowerable overhead locker in a passenger aircraft.

Lowerable overhead lockers in aircraft are known. Thus for example DE 41 30 644 C2 describes a lowerable overhead locker of a passenger aircraft with guide systems in the form of four-bar linkages at each side wall of the overhead locker and a gas-filled spring for each guide system which supplies a supporting force to swing up the overhead locker according to the weight thereof. During loading a displacing device detects the weight of the overhead locker and acts on the force application point of the gas-filled spring via a displacement connection to attain an adjustment that corresponds to the respective loaded weight of the overhead locker.

From DE 43 35 151 C2 a lowerable overhead locker is known which also comprises a respective guide system with an associated gas spring at its two side walls. The gas spring is actively connected to a supporting device which provides a supporting force for swinging-up of the overhead locker that is adjusted to the weight of the overhead locker. A blocking device allows the supporting device to be locked.

Finally DE 44 46 772 C1 describes a device for guiding a lowerable overhead locker with two four-bar linkages arranged on either side on the side walls of the overhead locker and one spring system per four-bar linkage for supporting the swinging-up movement of the overhead locker. A weighing plate arranged inside the overhead locker acts on pressure sensors arranged below the weighing plate which in turn are connected via at least one displacement connection to a displacement cylinder which ads on a displacement device for displacing the force application point of the spring system to displace it as a function of the weight of the overhead locker, so an adjusted torque opposing the load moment which results from the weight of the overhead locker is provided.

BREIF SUMMARY OF THE INVENTION

In principle in the case of a lowerable overhead locker there is a wish that, irrespective of the loading state of the overhead locker, the manual forces required to open and close the overhead locker remain at least approximately the same and have values which can still be easily applied even by a weaker person. The devices known from the prior art serving this purpose have relatively complicated constructions and are therefore potentially prone to faults.

The object underlying the invention is to disclose an improved device which inter alia is capable, in connection with a lowerable overhead locker, of providing a supporting force dependent on the loading state of the overhead locker.

This object is achieved according to the invention by a force supporting device which comprises the features disclosed herein. The force supporting device according to the invention allows pure mechanical control of a force support without the need for electrical or electronic components or actuators. According to an alternative however, electrical and electronic components may be used in the displacing device and the load determining device of the force supporting device according to the invention. The force supporting device according to the invention is compact, mechanically constructed in its essential components and may therefore be reliably operated independently of current and moreover is light, and this predestines it particularly for use in aircraft. The space requirement of the force supporting device according to the invention is substantially determined by the pivotal range of its bracket and the pivotal range of the oscillating lever. If the force supporting device according to the invention is used for example together with a lowerable overhead locker in an aircraft, according to one embodiment the pivotal range of the oscillating lever is approx. 45 degrees. However, it is understood that smaller or larger pivotal ranges may be provided if this is necessary for a specific case of use or seems advantageous. Likewise, if necessary and/or advantageous a plurality of force supporting devices according to the invention can be used together with an object to which a supporting force should be applied. In the case of a lowerable overhead locker of an aircraft two force supporting devices according to the invention are conventionally used. The force supporting device according to the invention is pivotally fastened by one end of its bracket to any desired supporting structure, while the other end of the bracket is used for connection to the object to which the supporting force should be applied.

With objects which have a closed position and an open position, according to one embodiment of the force supporting device the bracket can be pivoted about its swivelling axis between a first position, which corresponds to the closed position of the object, and a second position, which corresponds to the open position of the object. The oscillating lever of the displacing device can preferably only be released by the arresting device in the second position of the bracket, i.e. in the open position of the object, in order in this state of the displacing device to allow pivoting of the oscillating lever and therefore adjustment to loads of different weight. With an embodiment of this type, in all positions of the object between the open position through to and including the closed position, the oscillating lever is arrested at the point of its pivotal range extending from the first end position to the second end position, which point corresponds the determined load, so that a supporting force adjusted to the respectively determined load is applied.

According to a particularly preferred development of the above-described embodiment, in the second position of the bracket, preferably supported by abutment of an actuating and/or centering pin fastened to the bracket in a centering depression of the bearing plate, the swivelling axis of the one end of the gas-filled spring attached to the bracket aligns with the swivelling axis of the end of the oscillating lever pivotally attached to the bearing plate. When the oscillating lever is unlocked from the arrested position this thus prevents the possibility of a torque from the object, which is connected to the bracket to apply the supporting force, being exerted on the oscillating lever. The oscillating lever thus remains in its existing position despite the cancelled arrest. This position only changes if a changing load is communicated to the oscillating lever via the displacing device.

In one embodiment of the force supporting device according to the invention the arresting device comprises a latching claw, attached to the free end of the oscillating lever, which interacts with a segment of a circle-shaped toothing. In this embodiment the latching claw is preferably rotatably attached to the end of the oscillating lever and is resiliently pre-tensioned in the direction of an engagement with the segment of a circle-shaped toothing. The arrest therefore must be actively cancelled—a fact which is regarded as advantageous from safety perspectives since the force supporting device retains its arrested position in the event of a defect. To cancel the arrest, according to one embodiment the latching claw is connected to a release lever which is actuated in the second position of the bracket, preferably by the actuating and centering pin fastened thereto, in such a way that the latching claw comes clear from its engagement with the toothing. The release lever is preferably pivotally attached to the fixed end of the oscillating lever, and the pivotal movement of the release lever is transmitted to the latching claw by a cable or a rod assembly. To actuate the release lever, according to one embodiment the bracket comprises at least one already previously mentioned actuating and centering pin which actuates the release lever in the second position of the bracket. Alternatively the gas spring generating the supporting force is provided with a cap which actuates the release lever in the second position of the bracket. The already addressed segment of a circle-shaped toothing is preferably connected in these embodiments to the bearing plate by a segment of a circle-shaped bridge and the bearing plate is pivotally attached to the supporting structure for adjusting said actuating position. The bearing plate is preferably pivotal about the axis about which the bracket also pivots.

With the purely mechanical design of the force supporting device according to the invention mentioned in the introduction a pre-tensioning force acts on the oscillating lever in one preferred embodiment, which force acts in the opposite direction to a force exerted on the oscillating lever by the displacing device in the event of an increase in load, the force being of such a magnitude that it presses the oscillating lever into its first end position in the load-free state. In this embodiment the first end position is accordingly the position which the oscillating lever assumes if no load is determined by the load determining device interacting with the displacing device. The second end position of the oscillating lever is accordingly the position which the oscillating lever assumes if the maximum supporting force of the force supporting device should act. This occurs if the load determining device determines the presence of a correspondingly large load.

In preferred embodiments of the force supporting device according to the invention the displacement movement of the oscillating lever is damped. Uncontrolled oscillation of the oscillating lever after it has been unlocked and in the event of a displacement operation is thus prevented.

According to a preferred embodiment of the purely mechanical embodiment of the force supporting device according to the invention the pre-tensioning force acting on the oscillating lever is produced by a damper gas spring unit which simultaneously brings about damping of the oscillating lever movement addressed above. This type of embodiment is compact, inexpensive and reliable.

According to a further preferred embodiment the pre-tensioning force acting on the oscillating lever is produced by at least one tension spring whose one end is fixed to the bearing plate and whose other end is fixed to the oscillating lever.

In one embodiment of the purely mechanical force supporting device according to the invention the load determining device comprises a pivotal weighing plate which is intended to absorb a load and which transmits its pivotal movement, executed as a function of the magnitude of the load, to the oscillating lever by means of a transmitting device. This transmitting device can for example be a cable or rod system. With an embodiment of this type a changed load magnitude is accordingly passed by a corresponding pivotal movement of the weighing plate directly to the oscillating lever which is then displaced—with an unlocked arresting device—into a position corresponding to the new load magnitude.

In an alternative embodiment of a force supporting device according to the invention, which does not need to be completely mechanical, the load determining device also comprises a weighing plate which is intended to absorb a load, wherein however this weighing plate, in contrast to the above-described embodiment, is mounted on a plurality of load sensors to determine the magnitude of the load and wherein the determined load magnitude is also indicated to an actuator which displaces the oscillating lever between its first end position and its second position according to the determined load magnitude. This actuator preferably comprises an electric motor which can exert a displacement movement on the oscillating lever via a self-locking spindle drive. If the spindle drive is self-locking, the combination, described in connection with the purely mechanical embodiment of the force supporting device, of latching claw and toothing may also be omitted. The self-locking spindle drive then constitutes the arresting device for the oscillating lever. Since the load determination is mechanically decoupled from the displacement device in this embodiment, it is not necessary to provide damping of the displacement movement of the oscillating lever. The pivotal articulation of the weighing plate is also omitted and instead the weighing plate is floatingly mounted on the load sensors (for example on four load sensors). This is advantageous for example if the weighing plate is located on the base of a container, for example of an overhead locker, as the risk of the pivotally articulated weighing plate jamming is omitted.

The force supporting device according to the invention can be used wherever loads have to be moved predominantly by manual forces from one position into another position and maximum prescribed or reasonable actuation forces should not be exceeded. Two preferred embodiments of a force supporting device according to the invention in connection with a lowerable overhead locker in a passenger cabin of an aircraft will be described in more detail hereinafter with reference to the accompanying, schematic drawings, in which:

BREIF DESCRIPTION OF THE DRAWINGS

Figure 2:
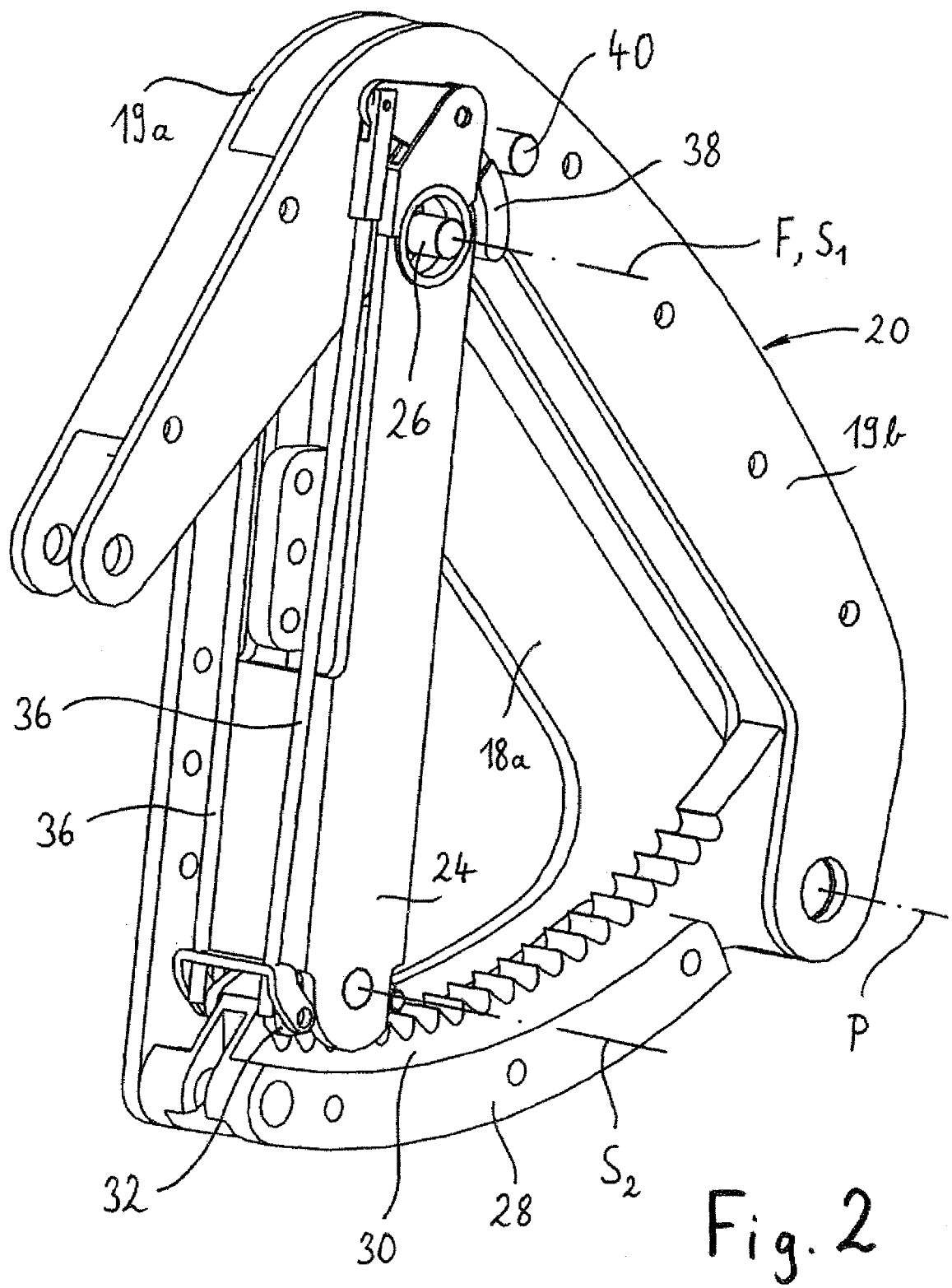
Figure 3:
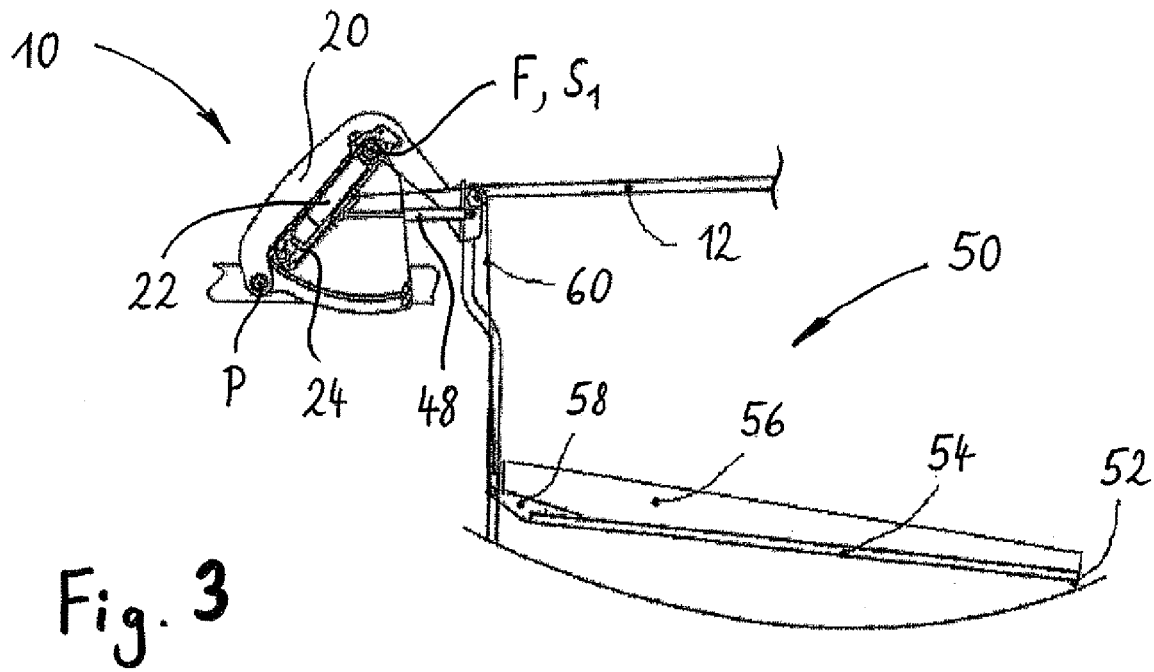
Figure 4:
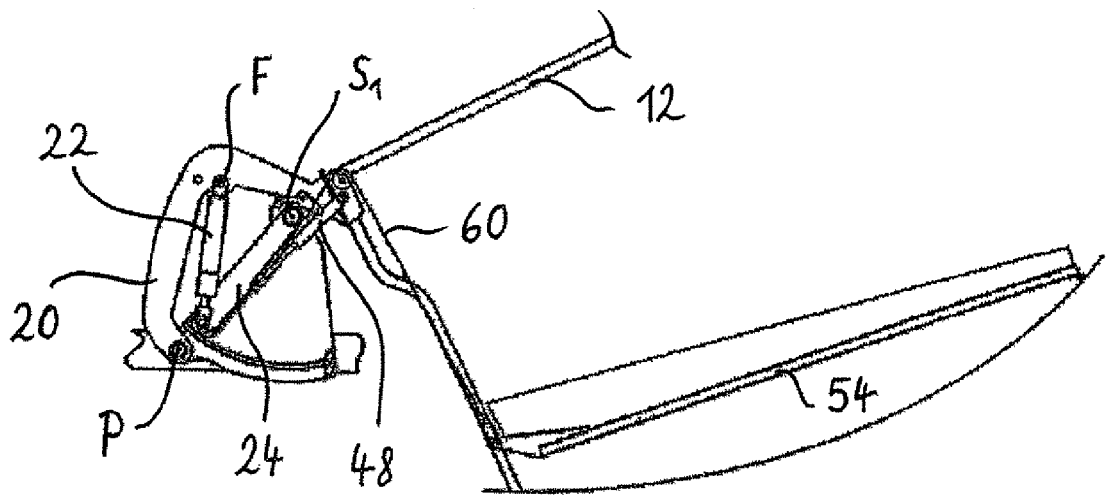
Figure 5:
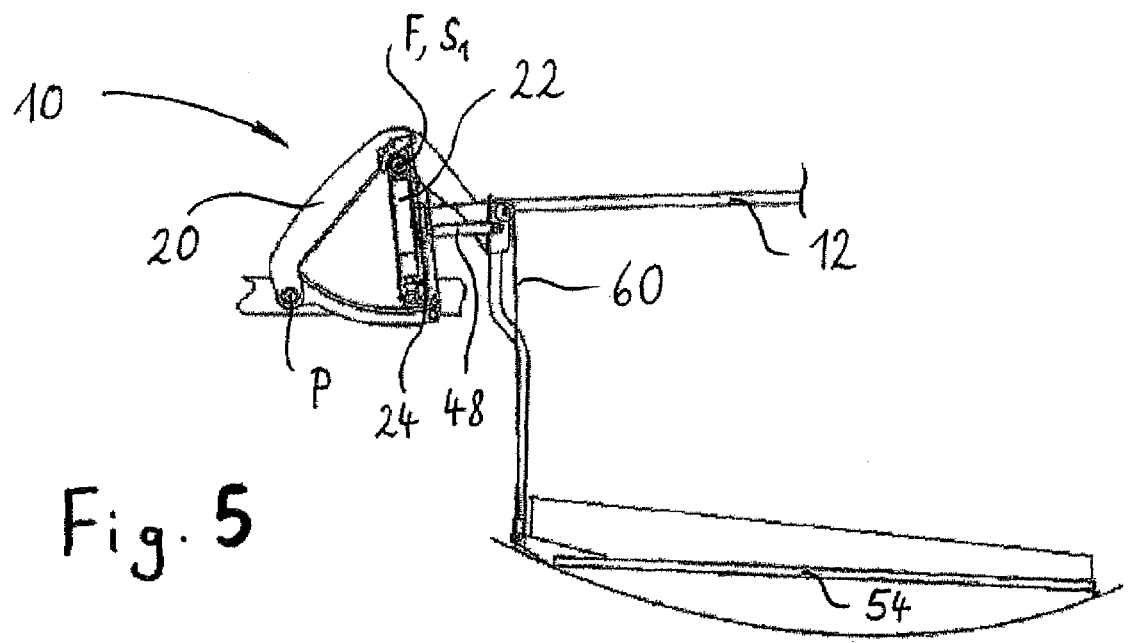
Figure 6:
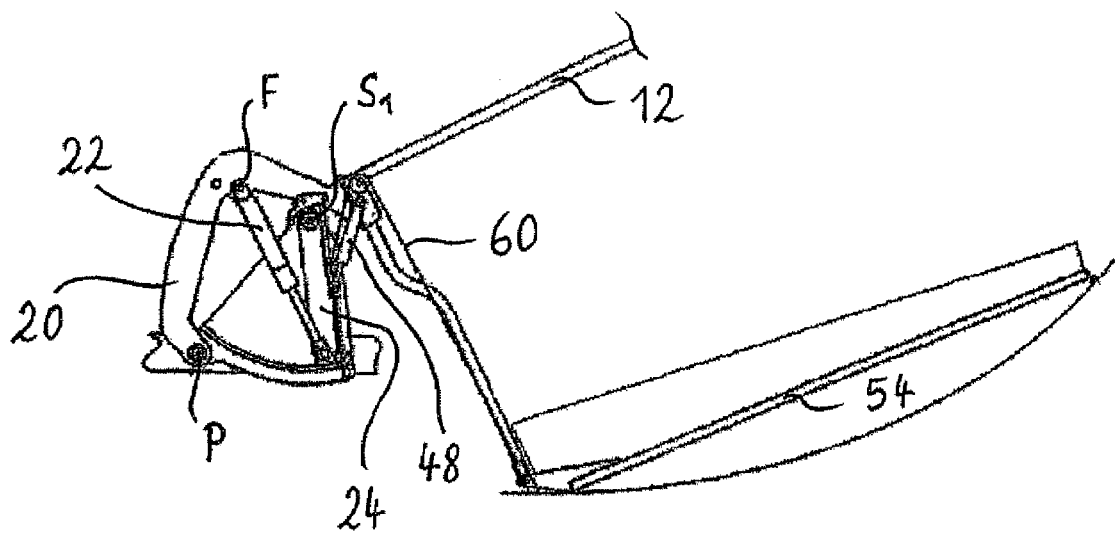
Figure 7:
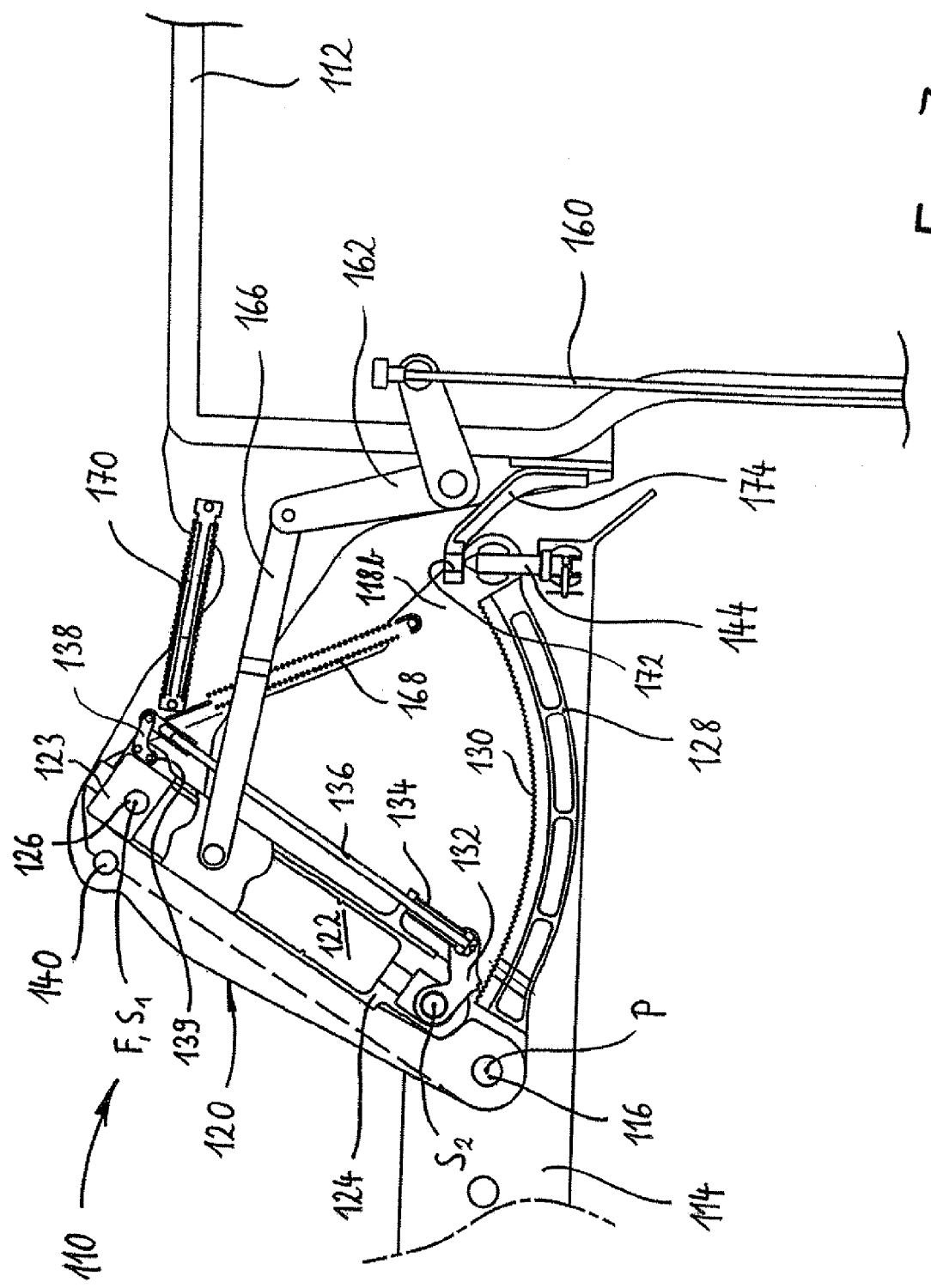
Figure 8:
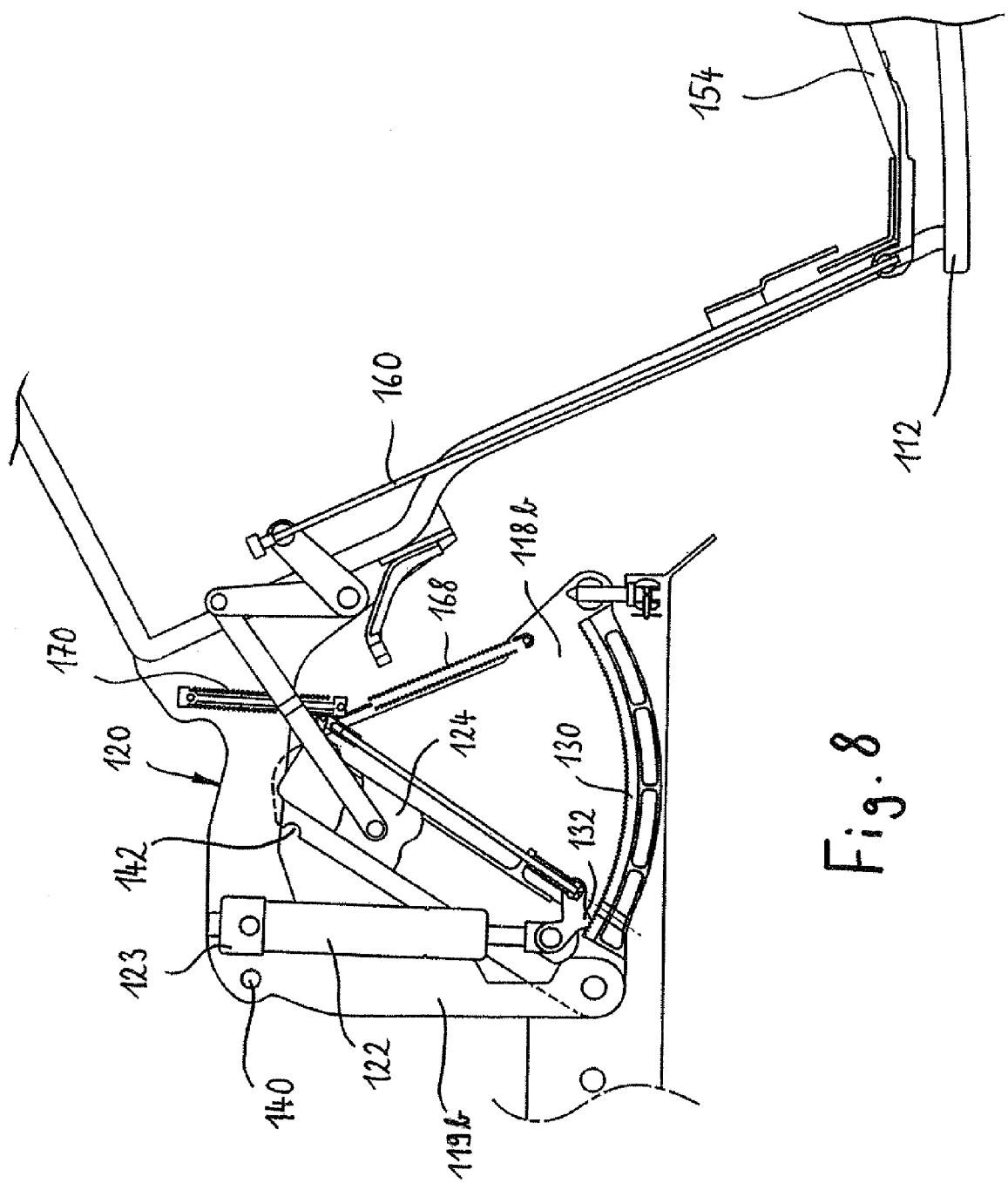
Figure 9:
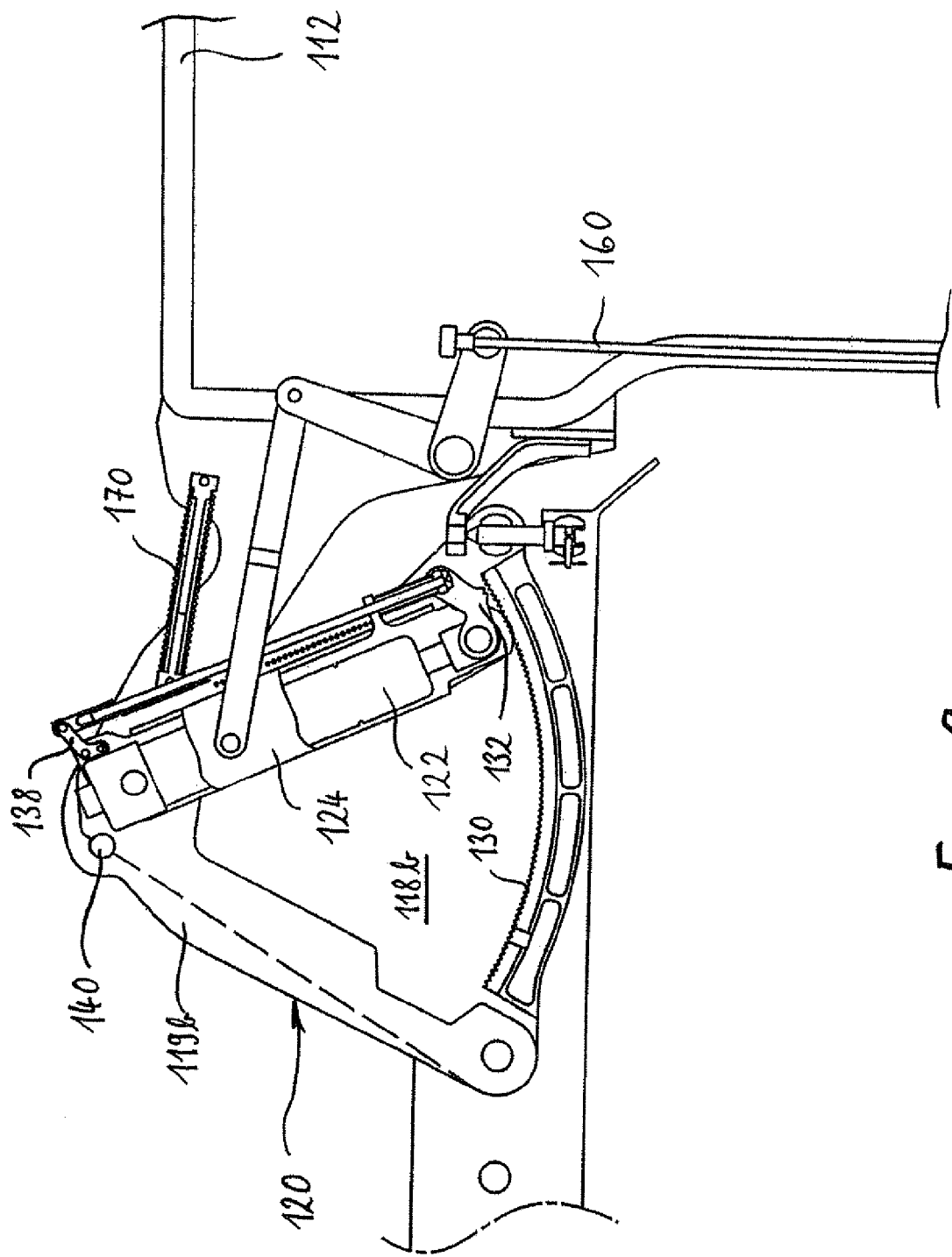
Figure 10:
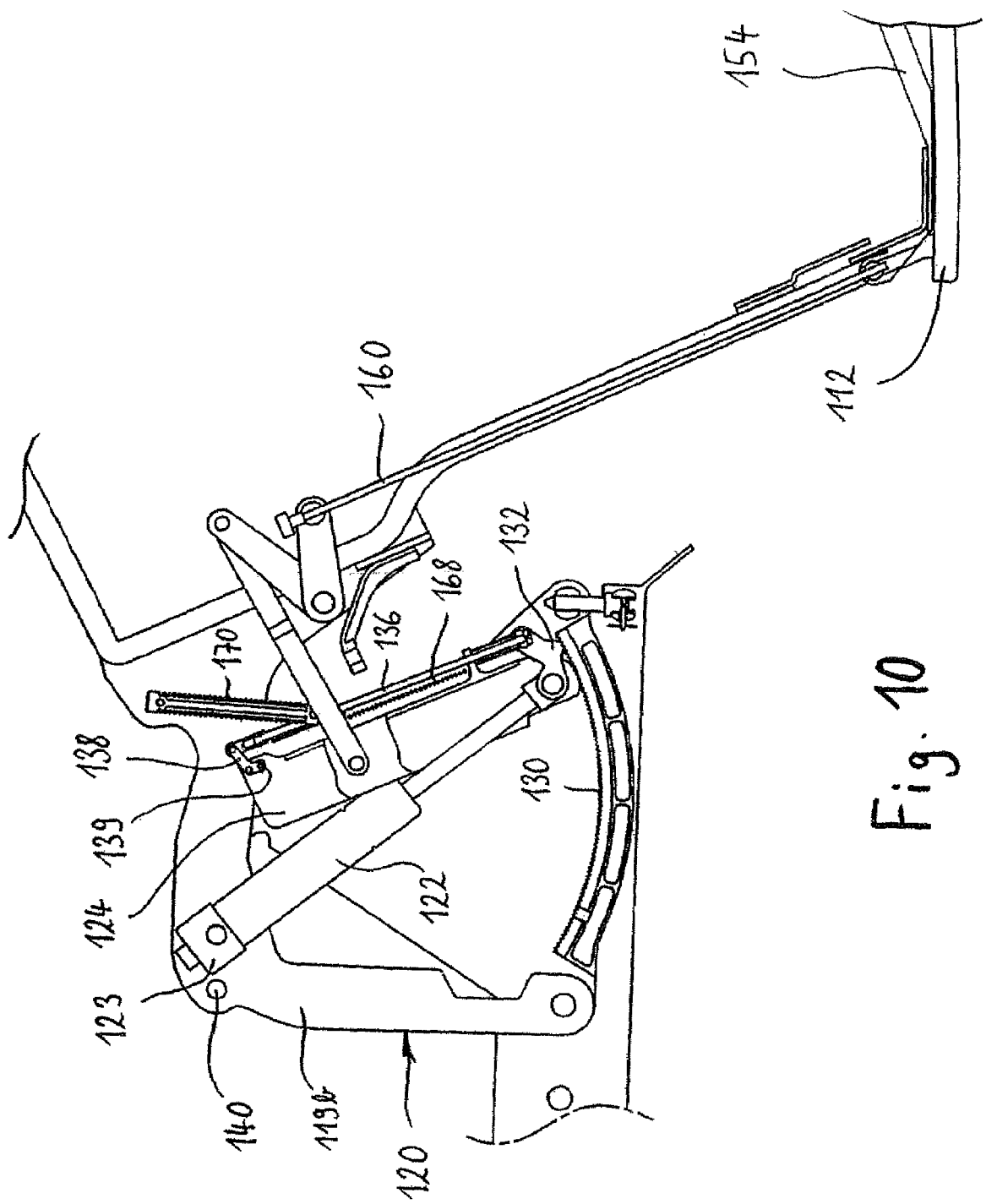

FIG. 1 shows a side view of a force supporting device for a lowerable overhead locker in an aircraft, partially disassembled for the purpose of better clarity, FIG. 2 shows a three-dimensional view of essential parts of the force supporting device from FIG. 1, FIG. 3 shows the force supporting device from FIG. 1 with an empty overhead locker in the fully lowered, i.e. open, position, FIG. 4 shows the force supporting device from FIG. 1 with the empty overhead locker from FIG. 3 in a non-lowered, i.e. closed, position, FIG. 5 shows the force supporting device from FIG. 1 with a maximum loaded overhead locker in the completely lowered, i.e. open, position, FIG. 6 shows the force supporting device from FIG. 1 with a maximum loaded overhead locker in the non-lowered, i.e. closed, position, FIG. 7 shows a side view of a modified embodiment of a force supporting device for a lowerable overhead locker in an aircraft, wherein the overhead locker is empty and is in the completely lowered, i.e. open, position, FIG. 8 shows the force supporting device from FIG. 7 with the empty overhead locker in the non-lowered, i.e. closed, position, FIG. 9 shows the force supporting device from FIG. 7 with a maximum loaded overhead locker in the completely lowered, i.e. open, position, and FIG. 10 shows the force supporting device from FIG. 7 with a maximum loaded overhead locker in the non-lowered, i.e. closed, position.

DETAILED DESCRIPTION

FIG. 1 shows in a side view a force supporting device, designated generally by 10, for providing a load-dependent supporting force for a lowerable overhead locker 12, only partially shown, in an aircraft. FIG. 2 shows essential parts of the force supporting device 10 in a three-dimensional view for better understanding.

The force supporting device 10 is fastened to a supporting structure which is formed here by a crossbeam 14 of an otherwise not shown fuselage. The force supporting device 10 is fastened to the crossbeam 14 by means of a pin 16 to which two bearing plates 18a, 18b on the one hand and one end of a bracket 20 on the other hand are articulated. The pin 16 fixes an axis P about which the bearing plates 18a, 18b, and in particular the bracket 20, can pivot.

The bracket 20, formed here from two plates 19a, 19b that are spaced apart from each other, has a boomerang-shaped appearance and is fastened with its other end to the back of the overhead locker 12. Approximately in the centre of the bracket 20, i.e. in the region of the tip of the form of the bracket 20 formed by the approximated V-shape, one end of a gas-filled spring 22, which is used to provide the supporting force that is to be applied by the force supporting device 10, is pivotally articulated to a swivelling axis F. The other end of the gas-filled spring 22 is pivotally articulated to the one, in FIG. 1, lower, end of an oscillating lever 24, whose other, in FIG. 1, upper, end is rotatably mounted on a journal 26 protruding from the bearing plate 18 and defining a swivelling axis $S_1$. In the illustrated embodiment the oscillating lever 24 has a U-shaped cross-section (see FIG. 2).

As may be seen in FIG. 1 the bearing plates 18a, 18b have the outer shape of a sector of a circle, to whose radially outer edge a bridge 28 produces a connection between the two bearing plates 18a, 18b of identical shape and size. The bearing plate 18b is congruently arranged with the bearing plate 18a and therefore not shown in FIG. 1 to allow better discernibility of the individual components of the force supporting device 10. The rear bearing plate 18b illustrated in FIG. 1, together with the front bearing plate 18a, not shown in FIG. 1, and the bridge 28 forms a type of housing in which all of the kinematics of the force supporting device 10 are accommodated.

To vary the supporting force transmitted from the force supporting device 10 to the overhead locker 12 the oscillating lever 24 can be pivoted within the angular range defined by the sector of a circle shape of the bearing plates 18a, 18b, the range being approximately 45 degrees in this case, about the journal 26 and therefore about the swivelling axis $S_1$, between a first end position, in which the force supporting device 10 does not exert any, or exerts almost no, support force, and a second end position in which the force supporting device 10 provides its maximum supporting force. FIG. 1 shows this second end position of the oscillating lever 24. In this position a lever arm L is maximal between the axis P and an axis of rotation $S_2$ fixed by the pivotal attachment of the lower end of the gas-filled spring 22, so that the force generated by the gas-filled spring 22 has its greatest effect on the bracket 20. In FIG. 1 the first end position of the oscillating lever 24 is at the edge of the bearing plates 18a, 18b that is opposite in the clockwise direction. In this first end position the pivot points of the axes P and $S_2$ and the pivot point F of the upper end of the gas-filled spring 22 are approximately on a line, i.e. the lever arm L is zero or almost zero, so in this first end position virtually no supporting moment is exerted on the bracket 20 by the gas-filled spring 22.

To be able to fix the oscillating lever 24 at a large number of points between its first end position and its second end position, there is an arresting device. This arresting device substantially comprises a segment of a circle-shaped toothing 30 arranged on the bridge 28 and a latching claw 32, rotatably attached to the free end of the oscillating lever 24, which is engaged with the toothing 30 in a pre-tensioned manner by means of a pressure spring 34 supported on the oscillating lever 24. In the illustrated embodiment the latching claw 32 is rotatable about the axis $S_2$. The number of intermediate positions at which the oscillating lever 24 may be fixed by means of the arresting device may be adjusted by a suitable design of the toothing 30 with more or less teeth in a wide region according to the requirements or wishes that are to be met. Of course the oscillating lever 24 can also be arrested in its two end positions by means of the arresting device.

To be able to open and close the overhead locker 12 the bracket 20 can be pivoted about the axis P between a first position, which corresponds to the closed position of the overhead locker 12, and which is reproduced in FIG. 1, and a second position, which corresponds to an open position of the overhead locker 12. During the pivoting operation of the bracket 20 between the two said positions, a corresponding supporting moment is exerted by the gas-filled spring 22 on the bracket 20, and therefore on the overhead locker 12, as a function of the position of the oscillating lever 24.

In the illustrated embodiment displacement of the oscillating lever 24 should only be possible in the open position of the overhead locker 12, i.e. in the second position of the bracket 20. As already mentioned, the latching claw 32 is resiliently pre-tensioned for engagement with the toothing 30, i.e. the oscillating lever 24 is normally arrested. To allow a displacement of the oscillating lever 24 in the open position of the overhead locker 12 the arrest thereof has to be cancelled. For this purpose a, in FIG. 1, right, end of the latching claw 32 is connected to the one end of the release lever 38 via a rod system 36, the release lever being pivotally arranged about an axis E at the, in FIG. 1, upper, end of the oscillating lever 24. The end of the release lever 38 opposing the end to which the rod system 36 is fastened is arcuate in shape and is intended for interaction with an actuating and centering pin 40 which is fastened to the bracket 20 in the vicinity of the articulation point of the gas-filled spring 22. This actuating and centering pin 40, which, in the illustrated embodiment, is present on the outer side of the plates 19a, 19b, i.e. on both outer sides of the bracket 20, in each case, rests in the second position of the bracket 20, i.e. in the open position of the overhead locker 12, in a centering depression 42 formed on each bearing plate 18a, 18b, and in the process presses on the arcuate arm of the release lever 38, whereby this is pivoted counterclockwise about the axis E. This pivoting movement of the release lever 38 is transmitted via the rod system 36 to the latching claw 32 which is thereby forcibly pulled from its engagement with the toothing 30.

In this second position of the bracket 20 the swivelling axis F of the end of the gas-filled spring 22 provided on the bracket aligns with the swivelling axis $S_1$ of the oscillating lever 24. If the arrest of the oscillating lever 24 is cancelled as described above, it is thus no longer possible for the torque exerted on the oscillating lever 24 by the overhead locker 12 via the bracket 20 to act. A sudden, undesired movement of the oscillating lever 24 after it has come free of the arrest is thus prevented.

It may be seen from the foregoing description that the arrest of the oscillating lever 24 should only be cancelled in the illustrated embodiment if the bracket 20 is actually in its second position, in other words the overhead locker 12 is completely open. To ensure this the bearing plate 18 can be rotated to a limited extent about the axis P by means of a set screw 44. When the overhead locker 12 is open the force supporting device 10 may thus be adjusted such that the actuating and centering pin 40 are located exactly in the centering depression 42.

The load-dependent displacement of the force supporting device 10 will be described in more detail hereinafter with additional reference to FIGS. 3 to 6. As already mentioned, the supporting force provided by the force supporting device 10 varies as a function of the position of the oscillating lever 24. To pivot the oscillating lever 24 there is a displacement device, generally designated by 46, of which a damper gas spring unit 48 forms a part and whose one end is pivotally connected to the oscillating lever 24 and whose other end is pivotally connected to the end of the bracket 20 fastened to the overhead locker 12. This gas spring unit 48 is primarily used to exert a pre-tensioning force on the oscillating lever 24 which, in the load-free state, pushes the oscillating lever 24 into its first end position in which the supporting force provided by the force supporting device 10 assumes its minimum value. The gas spring unit 48 is secondarily used to damp any pivotal movement of the oscillating lever 24 to avoid an undesirable "knocking" of the oscillating lever 24. In the illustrated embodiment these two functions—provision of a pre-tensioning force on the oscillating lever and damping of the pivotal movement of the oscillating lever—are combined in the damper gas spring unit 48 although these functions can also be exercised in a constructionally separate manner by separate components.

The displacing device 46 interacts with a load determining device 50 to determine the extent of a required displacement of the oscillating lever 24. The load determining device 50 comprises a weighing plate 54, with lateral limit stops 56, pivotally articulated to the leading edge of the base of the overhead locker 12 at 52. At the opposing trailing edge of the weighing plate 54 there is located a holding device 58 which is connected to a transmitting device in the form of a Bowden wire 60 which is guided at the upper edge of the overhead locker 12 over a deflection roller 62 and is connected to the oscillating lever 24 at an eye 64. The pivotal movement, which the weighing plate 54 executes about the swivelling axis located at 52, as a function of the weight placed on it, is thus transmitted to the oscillating lever 24. In the process the force acting on the oscillating lever 24 via the Bowden wire 60 acts in the opposite direction to the pre-tensioning force which is exerted on the oscillating lever 24 by the gas spring unit 48. During operation of the force supporting device 10, when the oscillating lever 24 is unlocked, an equilibrium of forces between the pre-tensioning force exerted by the gas spring unit 48 and the weight of the load, which is situated on the weighing plate 54, acting on the oscillating lever 24 via the Bowden wire 60 is therefore established on the oscillating lever. As the load increases the equilibrium position of the oscillating lever 24, starting from its first end position, is therefore displaced further and further in the direction of its second end position until finally the second end position is reached at the highest permissible load.

For the purpose of better understanding FIGS. 3 to 6 show the overhead locker 12 in the open and closed positions, once without load and once with the highest permissible load.

FIG. 3 shows the overhead locker 12 in the open, i.e. fully lowered, position. The bracket 20 is therefore located in its second position. There is no load on the weighing plate 54, the oscillating lever 24 is therefore in its first end position in which, in the present embodiment, no, or at best a very low, supporting force is provided.

FIG. 4 shows the overhead locker 12 from FIG. 3 in its closed position. The bracket 20 assumes its first position while the position of the oscillating lever 24 is arrested in the position—here the first end position—which has been established when the overhead locker 12 is open according to FIG. 3.

FIG. 5 shows the overhead locker 12 again in its open position, i.e. the bracket 20 is again in its second position although the highest permissible load (not shown) now rests on the weighing plate 54. The weighing plate 54 is pivoted downwards compared with the state reproduced in FIG. 3 and this pivotal movement has moved the oscillating lever 24 into its second end position.

FIG. 6 reproduces the fully loaded overhead locker 12 from FIG. 5 in its closed position in which the bracket 20 assumes its first position while the oscillating lever 24 is arrested in the position—here in its second end position—which has been established when the overhead locker 12 is open according to FIG. 5I FIGS. 3 to 6 show the possible extreme situations. It is understood that the oscillating lever 24 can also assume any position located between its two end positions as a function of the load situated on the weighing plate 54.

FIGS. 7 to 10 show a second embodiment of the force supporting device 110 for providing a load-dependent supporting force for a lowerable overhead locker 112 for a plurality of loading states and positions of the overhead locker 112. With the embodiment illustrated in FIGS. 1 to 6 parts with the same function bear the corresponding reference numeral, but increased by 100, of the first embodiment. The basic constructional structure and its function match those of the first embodiment for which reason only the existing differences from the first embodiment in construction and function will be described hereinafter.

Compared with the first embodiment of the force supporting device 10 the second embodiment 110 has a reduced installation height and a reduced weight. To reduce the installation height the swivelling axis F is relocated slightly downwards and the gas-filled spring 122 provided with a cap 123 while the fastening point of the release lever 138 has been relocated slightly to the right based on the figures. The cap 123 may thus actuate the release lever 138. The actuating and centering pin 40 of the first embodiment has therefore become purely a centering pin 140 in the second embodiment which now only has the task of bringing the swivelling axes F and $S_1$ into a position so they are congruent in the fully lowered, i.e. open, position of the overhead locker 112. This aligned arrangement of the two swivelling axes F and $S_1$ is achieved if the centering pins 140 present on both sides of the bracket 120 are accommodated in the centering depression 142 of the bearing plates 118a, 118b. To minimise friction and to allow a smooth, non-jerky course of movement the end of the release lever 138 that comes into connect with the cap 123 is provided with a roller 139.

Instead of the cable 60, in the second embodiment a rod system 160 transmits the movement of the weighing plate 154 to a reversing lever 162 which, in turn, is articulated to the oscillating lever 124 by a tension rod system 166 with an eye 164.

Instead of the damper gas spring unit 48 there are two tension springs 168 of which only one is shown in FIGS. 7 to 10. Their one, in the figure, lower, end is fixed to the bearing plate 118b while its opposite, other end is fastened to the oscillating lever 124. The other tension spring 168 is fastened with its one end to the bearing plate 118a and with its other end likewise to the oscillating lever 124. Between the upper fastening points of the two tension springs 168 and the swivelling axis $S_1$ there is a lever arm, so in the load-free state the force of the two tension springs 168 pre-tensions the oscillating lever 124 into the first end position described in connection with FIGS. 1 to 6. No damper is provided in the second embodiment, instead the tooth forms of the toothing 130 and latching claw 132 are configured such that easy and safe locking and unlocking of the oscillating lever 124 takes place when the release lever 138 is actuated.

Finally the second embodiment also comprises two supporting springs 170 constructed as over-centre springs, of which only one is shown in FIGS. 7 to 10. The one end of these supporting springs 170 is pivotally attached to the bearing plate 118a, 118b while its opposite, other end is articulated to the plate 119a or 119b of the bracket 120. By means of these supporting springs 170 on the one hand the force support is increased just before the overhead locker 112 is closed, and this facilitates final closure of the overhead locker 112, and, on the other hand, in the open state of the overhead locker 112, the supporting springs 170 exert a force which reliably holds a, in particular, empty overhead locker 112 in the open position and prevents the open overhead locker from swinging.

A set screw 144, which as in the first embodiment is used for adjusting the open position of the overhead locker 112, can also be used in the second embodiment as a transportation securing mechanism. For this purpose, when the overhead locker 112 is open it is screwed into a threaded hole 172 of an arm 174 which is fastened to the overhead locker 112. The unit comprising force supporting device 110 and overhead locker 112 may therefore be efficiently transported, for example by the manufacturer of the overhead locker, to the aircraft factory.

FIG. 7 shows the overhead locker 112 without loading in an open position. The oscillating lever 124 is in its first end position, the latching claw 132 is, as may be seen, released from the toothing 130.

FIG. 8 shows the empty overhead locker 112 from FIG. 7 in its closed position. The latching claw 132 is engaged with the toothing 130 and arrests the oscillating lever 124 in its first end position.

FIG. 9, in contrast to FIGS. 7 and 8, shows a maximally loaded overhead locker 112 in the open position. The latching claw 132 has been lifted from the toothing 130 and the oscillating lever 124 has been moved into its second end position.

FIG. 10 shows the maximally loaded overhead locker 112 in its closed position. In this case the oscillating lever 124 is arrested in its second end position by means of the latching claw 132 and the toothing 130.

The invention claimed is:

1. Force supporting device (10; 110) for providing a load-dependent supporting force, for a lowerable overhead locker (12; 112) in an aircraft, comprising
a bracket (20; 120), having a first end attached to a supporting structure so as to be pivotal about an axis (P) and a second end configured for connection to an object to which the supporting force should be applied,
a gas-filled spring (22; 122), having a first end pivotally articulated to the bracket (20; 120) and a second end pivotally articulated to a first end of an oscillating lever (24; 124), the oscillating lever having a second end pivotally attached to at least one bearing plate (18a, 18b; 118a, 118b) and which can pivot relative to the bearing plate (18a, 18b; 118a, 118b) between a first end position and a second end position,
an arresting device for arresting the oscillating lever (24; 124) at a plurality of positions in the region of its first end position to the second end position, and
a displacing device (46; 146) for pivoting the oscillating lever (24; 124) between its first end position and its second end position as a function of a load determined by a load determining device (50; 150) which interacts with the displacing device (46; 146).

2. Force supporting device according to claim 1, characterised in that the bracket (20; 120) can be pivoted about the axis (P) between a first position, which corresponds to a closed position of the object, to which the supporting force should be applied, and a second position, which corresponds to an open position of the object, to which the supporting force should be applied, and in that the arresting device releases the oscillating lever (24; 124) only in the second position of the bracket (20; 120) to allow the displacing device (46; 146) to pivot the oscillating lever (24; 124).

3. Force supporting device according to claim 2, characterised in that the second position of the bracket (20; 120) a swivelling axis (F) of the first end of the gas-filled spring (22; 122) attached to the bracket (20; 120) aligns with a swivelling axis ($S_1$) of the second end of the oscillating lever (24; 124) pivotally attached to the bearing plate (18a, 18b; 118a, 118b).

4. Force supporting device according to claim 1, characterised in that the arresting device comprises a latching claw (32; 132), attached to the free first end of the oscillating lever (24; 124), which interacts with a segment of a circle-shaped toothing (30; 130).

5. Force supporting device according to claim 4, characterised in that the latching claw (32; 132) is rotatably attached to the first end of the oscillating lever (24; 124) and is resiliently pre-tensioned in the direction of an engagement with the segment of a circle-shaped toothing (30; 130).

6. Force supporting device according to claim 5, characterised in that the latching claw (32; 132) is connected to a release lever (38; 138) which is actuated in the second position of the bracket (20; 120) in such a way that the latching claw (32; 132) comes clear from its engagement with the toothing (30; 130).

7. Force supporting device according to claim 6, characterised in that the release lever (38;138) is pivotally attached to the fixed second end of the oscillating lever (24; 124), and in that its pivotal movement is transmitted to the latching claw (32; 132) by a cable or a rod assembly (36; 136).

8. Force supporting device according to claim 6, characterised in that the bracket (20) comprises at least one actuating and centering pin (40) which actuates the release lever (38) in the second position of the bracket (20), in that the segment of a circle-shaped toothing (30) is connected to the bearing plate (18a, 18b), and in that the bearing plate (18a, 18b) is pivotally attached to the supporting structure for adjustment of this actuating position.

9. Force supporting device according to claim 6, characterised in that the gas-filled spring (122) has a cap (123) which actuates the release lever (138) in the second position of the bracket (120), in that the segment of a circle-shaped toothing (130) is connected to the bearing plate (118a, 118b), and in that the bearing plate (118a, 118b) is pivotally attached to the supporting structure for adjustment of this actuating position.

10. Force supporting device according to claim 8, characterised in that the bearing plate (18a, 18b; 118a, 118b) is pivotal about the axis (P).

11. Force supporting device according to claim 1, characterised in that a pre-tensioning force acts on the oscillating lever (24; 124) which acts in the opposite direction to a force exerted on the oscillating lever (24; 124) by the displacing device (46; 146) in the event of an increase in load and which presses the oscillating lever (24; 124) into its first end position in the load-free state.

12. Force supporting device according to claim 11, characterised in that the pre-tensioning force acting on the oscillating lever (24) and damping of the oscillating lever movement are generated or brought about by a damper gas spring unit (48).

13. Force supporting device according to claim 11, characterised in that the pre-tensioning force acting on the oscillating lever (124) is generated by at least one tension spring (168) having a first end fixed to the bearing plate (118a,118b) and a second end fixed to the oscillating lever (124).

14. Force supporting device according to claim 1, characterised in that the displacement movement of the oscillating lever (24) is damped.

15. Force supporting device according to claim 1, characterised in that the load determining device (50; 150) comprises a pivotal weighing plate (54; 154) which is intended to absorb a load and which transmits its pivotal movement, executed as a function of the magnitude of the load, to the oscillating lever (24; 124) by means of a transmitting device.

16. Force supporting device according to claim 15, characterised in that the transmitting device is a Bowden wire (60) or a rod assembly (160).

17. Force supporting device according to claim 1, characterised in that the object to which the supporting force should be applied is a lowerable overhead locker (12; 112) in an aircraft.

18. Force supporting device according to claim 17, characterised in that the load determining device (50; 150) comprises a pivotal weighing plate (54; 154) which is intended to absorb a load and which transmits its pivotal movement, executed as a function of the magnitude of the load, to the oscillating lever (24; 124) by means of a transmitting device, and the weighing plate (54; 154) is arranged in the base region of the overhead locker (12; 112).

* * * * *